US012572262B2

(12) United States Patent
Ikeda

(10) Patent No.: US 12,572,262 B2
(45) Date of Patent: Mar. 10, 2026

(54) COMMUNICATION APPARATUS, IMAGE GENERATION SYSTEM, CONTROL METHOD OF COMMUNICATION APPARATUS, CONTROL METHOD OF IMAGE GENERATION SYSTEM, AND NON-TRANSITORY COMPUTER-READABLE STORAGE MEDIUM

(71) Applicant: CANON KABUSHIKI KAISHA, Tokyo (JP)

(72) Inventor: Atsushi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 18/507,990

(22) Filed: Nov. 13, 2023

(65) Prior Publication Data

US 2024/0160336 A1 May 16, 2024

(30) Foreign Application Priority Data

Nov. 14, 2022 (JP) ................................. 2022-182058

(51) Int. Cl.
| | |
|---|---|
| *G06F 3/048* | (2013.01) |
| *G06F 3/0482* | (2013.01) |
| *G06F 3/04845* | (2022.01) |
| *G06T 3/40* | (2006.01) |
| *G06T 11/20* | (2006.01) |
| *G06T 11/60* | (2006.01) |

(52) U.S. Cl.
CPC ........ *G06F 3/0482* (2013.01); *G06F 3/04845* (2013.01); *G06T 3/40* (2013.01); *G06T 11/203* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 9,111,007 | B2 * | 8/2015 | Carounanidy ...... | G06F 16/9577 |
| 9,740,791 | B1 * | 8/2017 | Killian .................. | G06F 40/143 |
| 2015/0067469 | A1 * | 3/2015 | Shuto .................... | G06F 40/169 |
| | | | | 715/232 |
| 2016/0070551 | A1 * | 3/2016 | Miller ................ | G06F 16/9577 |
| | | | | 717/148 |

(Continued)

FOREIGN PATENT DOCUMENTS

| | | |
|---|---|---|
| JP | 2015056046 A | 3/2015 |
| JP | 2018147511 A | 9/2018 |
| JP | 6524306 B2 | 6/2019 |

*Primary Examiner* — Thanh T Vu
(74) *Attorney, Agent, or Firm* — Canon U.S.A., Inc. IP Division

(57) ABSTRACT

A communication apparatus capable of communication with an image generation system functioning as a cloud browser, the communication apparatus comprising: a reception unit configured to receive, from the image generation system, selection element related information related to a selection element in a Web page being displayed using the cloud browser; a generation unit configured to generate, based on the selection element related information, a selection UI to display the selection element converted from a first display format in the Web page to a second display format different from the first display format; and a control unit configured to cause a display unit of the communication apparatus to display the selection UI.

13 Claims, 14 Drawing Sheets

(56)         References Cited

U.S. PATENT DOCUMENTS

2016/0267094 A1*  9/2016  Darnell ................. G06F 16/958
2019/0075130 A1    3/2019  Petry et al.
2020/0104232 A1*  4/2020  Padmanabhan ..... G06F 11/3438
2020/0257756 A1*  8/2020  Sheng ................... G06F 16/972
2021/0065272 A1    3/2021  Phillips et al.

* cited by examiner

VIRTUAL MACHINE

101

CPU

102

ROM

105

103

RAM

104

INTERFACE

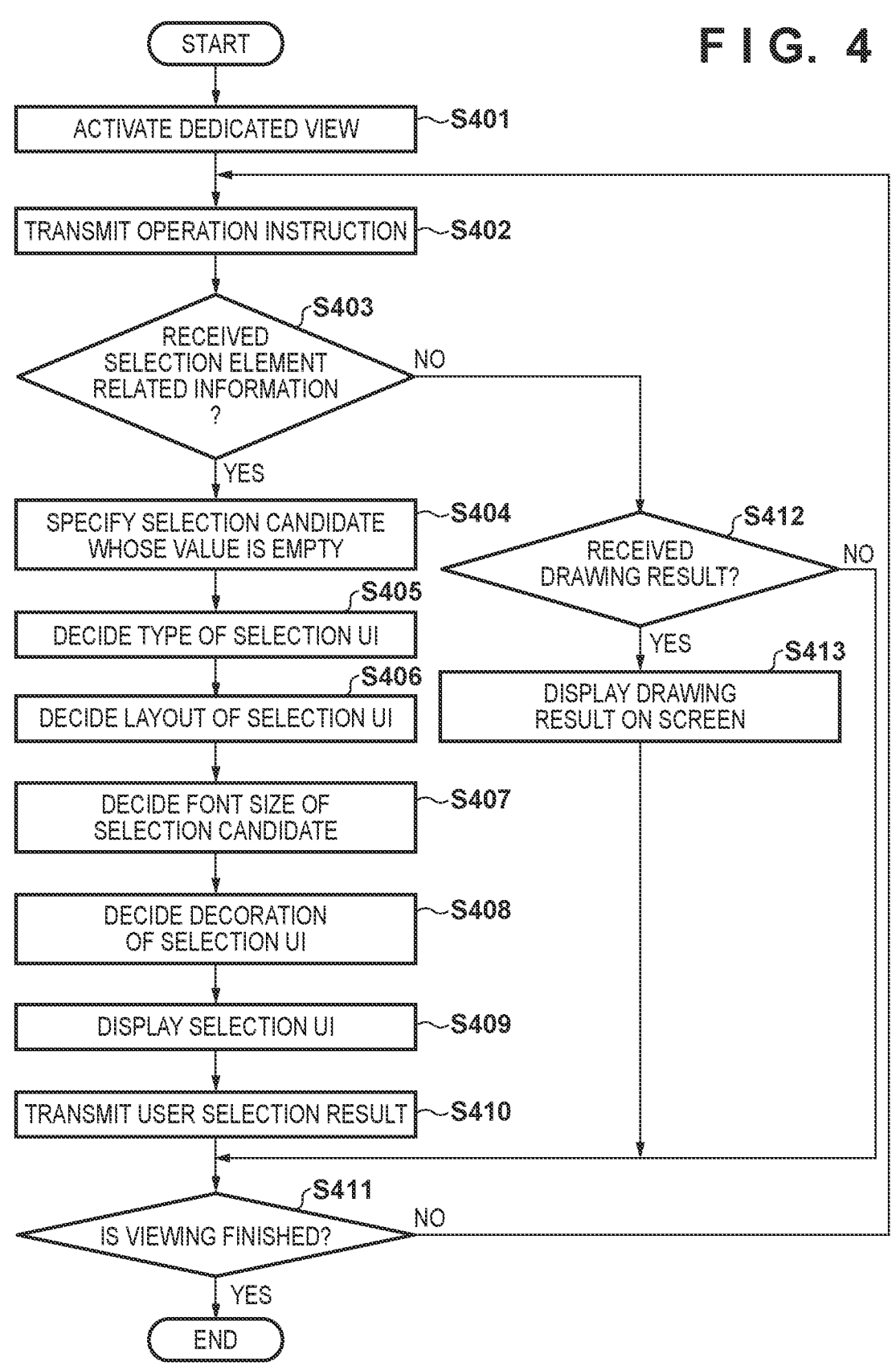
F I G. 4

F I G. 5A

```
// x, y ARE POSITION ON SCREEN PRESSED BY USER. INFORMATION OF select ELEMENT OF TARGET IS STORED IN target.
var target = document.elementFromPoint(x, y);

// INFORMATION OF select ELEMENT IS STORED IN target
target.length; // NUMBER OF OPTION ELEMENT THAT select ELEMENT INCLUDES
target.options[i].value; // STORES VALUE OF i-TH ELEMENT OF options. E.G., "Tokyo", "Kanagawa"
target.style.fontSize; // FONT SIZE OF select ELEMENT
target.getBoundingClientRect(); //RECTANGULAR REGION IN WHICH select ELEMENT IS DISPLAYED
```

F I G. 5B

```
// SELECT options ELEMENT DESIGNATED IN PROGRAM EVEN WITHOUT USER PRESS
// SELECTION IS CANCELLED WHEN CHANGED FROM true TO false
target.options[i].selected=true;
```

F I G. 6A

```
<label for="prefecture-select">Choose a prefecture:</label>
<select name="prefectures" id="prefecture-select">
    <option value="">----------</option>
    <option value="Tokyo">Tokyo</option>
    <option value="Kanagawa">Kanagawa</option>
    <option value="Saitama">Saitama</option>
</select>
```

F I G. 6B

```
{
   "element" : "select",
   "rect" : { "top" : 60, "left" : 20, "width" : 160, "height" : 160 },
   "option" : [
      { "id" : 0, "value" : "", "label" : "----------", "selected" : 1,
         "style" : "font-size:36px; width: 160px; height: 40px;" },
      { "id" : 1, "value" : "Tokyo", "label" : "Tokyo", "selected" : 0,
         "style" : "font-size:36px; width: 160px; height: 40px;" },
      { "id" : 2, "value" : "Tokyo", "label" : "Kanagawa", "selected" : 0,
         "style" : "font-size:36px; width: 160px; height: 40px;" },
      { "id" : 3, "value" : "Tokyo", "label" : "Saitama", "selected" : 0,
         "style" : "font-size:36px; width: 160px; height: 40px;" },
   ],
   "style" : "background-color: white;"
}
```

F I G. 6C

|  | Web Page Style | Device GUI Style |
|---|---|---|
| select | background-color:white; | background-color:black; |
| rect | top:60,left:20,width:160,height:160 | top:60,left:20,width:400,height:220 |
| option[0] | font-size: 36px;<br>width: 160px; height: 40px; | None; |
| option[1] | font-size: 36px;<br>width: 160px; height: 40px; | font-size: 44px;<br>width: 180px; height: 100px; |
| option[2] | font-size: 36px;<br>width: 160px; height: 40px; | font-size: 40px;<br>width: 180px; height: 100px; |
| option[3] | font-size: 36px;<br>width: 160px; height: 40px; | font-size: 44px;<br>width: 180px; height: 100px; |
| layout | 1x4 | 2x2 |

F I G. 6D

```
{ "selected-value" : "Tokyo", "selected-id" : 1 }
```

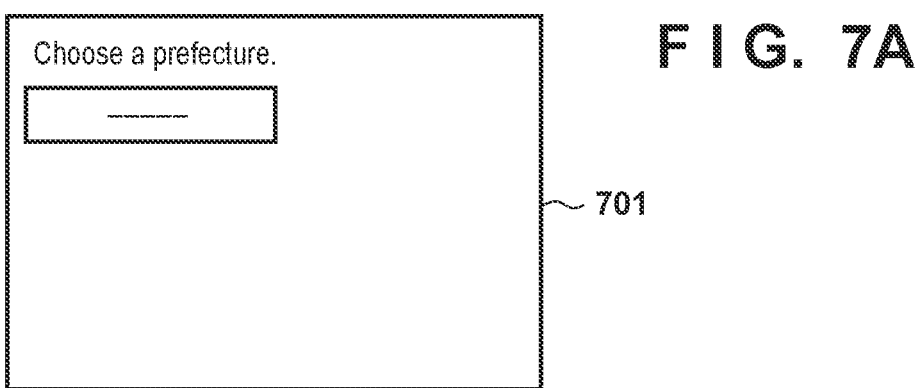
FIG. 7A
~ 701
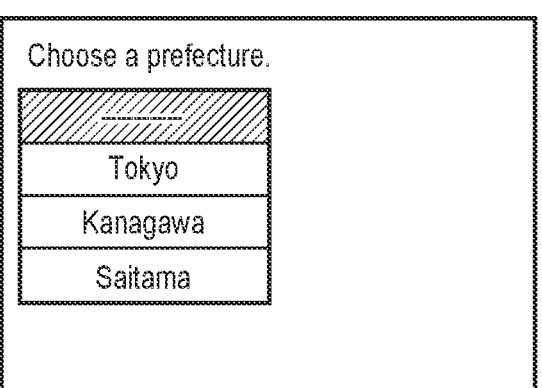
FIG. 7B
FIG. 7C
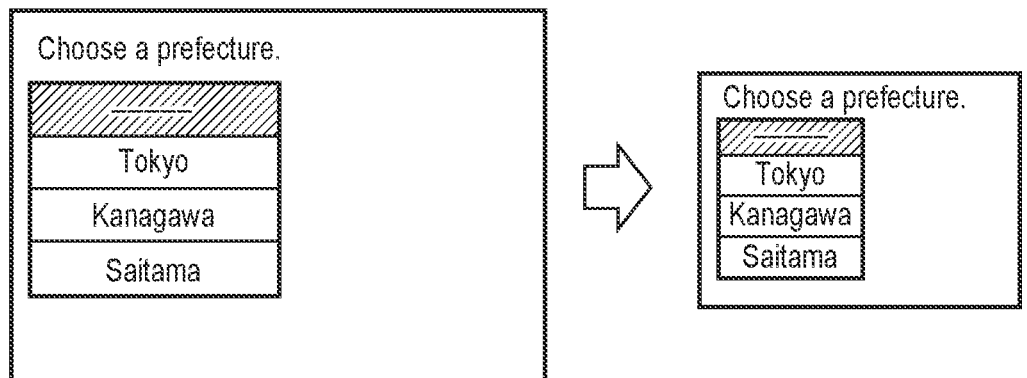

F I G.   8A
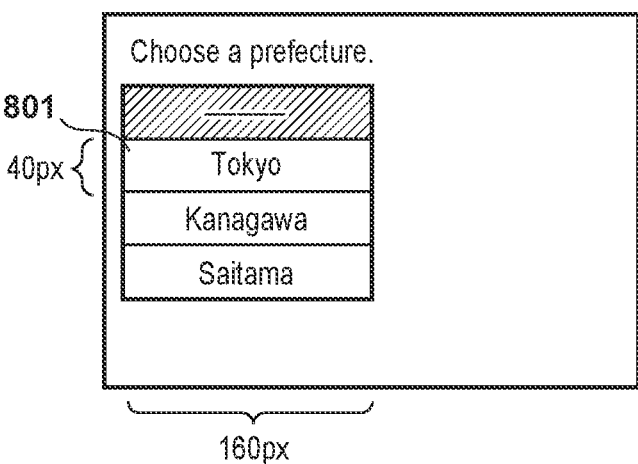
F I G.   8B
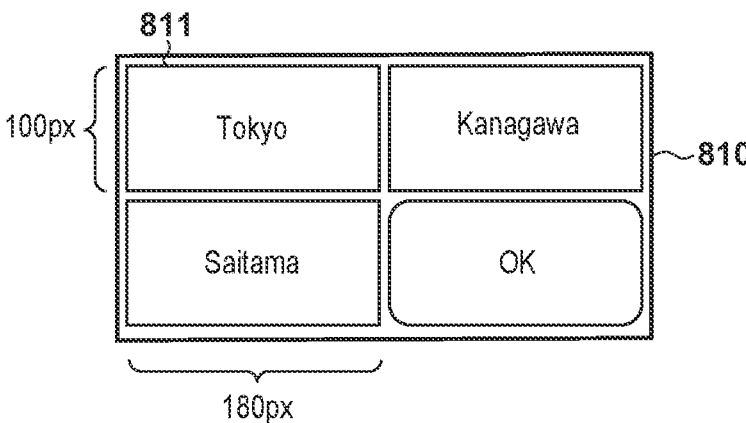
F I G.   8C
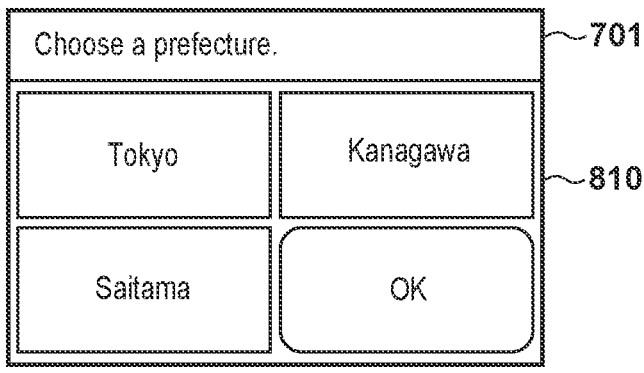

F I G. 9A
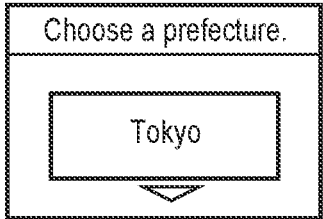
F I G. 9B
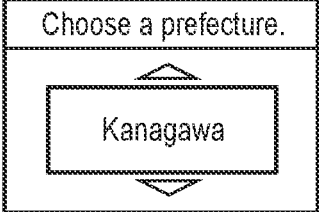
F I G. 9C
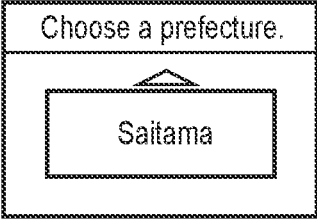

F I G. 10
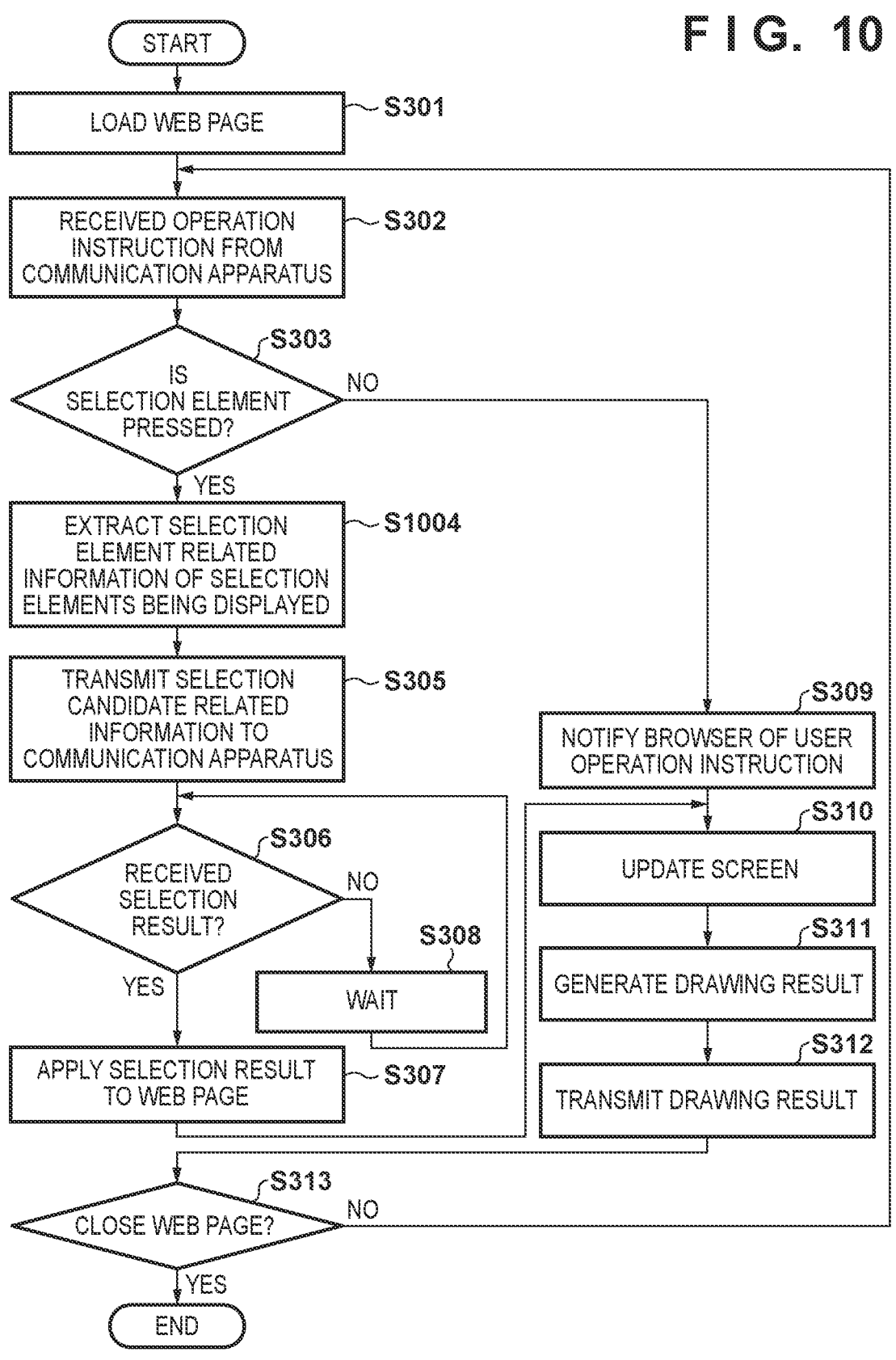

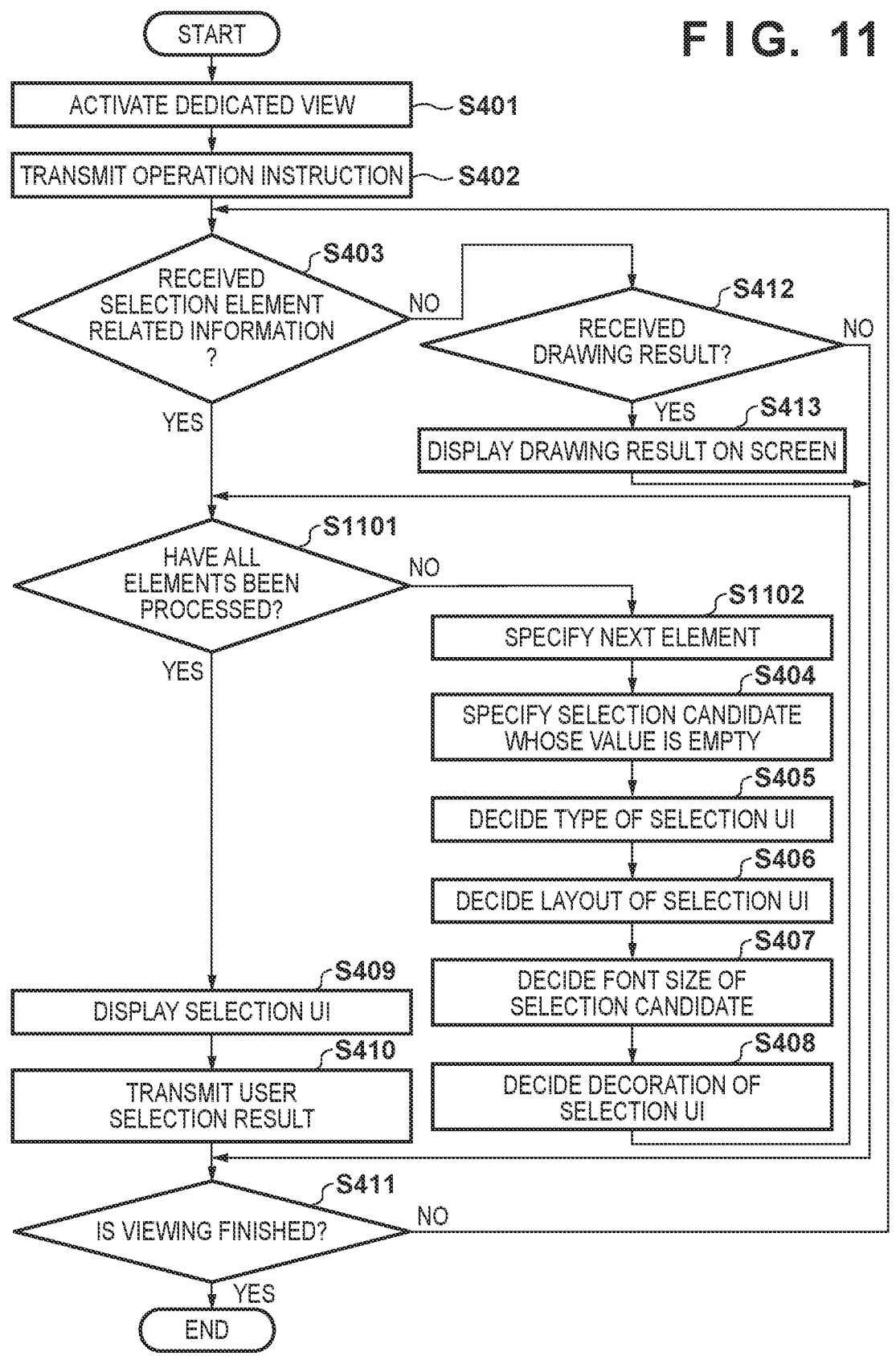
F I G. 11

F I G. 12

```
<p>Choose a prefecture:</p>
<div>
  <input type="radio" id="tokyo" name="prefecture" value="Tokyo"
      checked>
  <label for="tokyo">Tokyo</label>
</div>
<div>
  <input type="radio" id="kanagawa" name="prefecture" value="Kanagawa">
  <label for="kanagawa">Kanagawa</label>
</div>
<div>
  <input type="radio" id="chiba" name="prefecture" value="Saitama">
  <label for="chiba">Saitama</label>
</div>

<p>Choose a transportation:</p>
<div>
  <input type="checkbox" id="car" value="Car"  checked>
  <label for="car">Car</label>
</div>
<div>
  <input type="checkbox" id="plane" value="Plane">
  <label for="plane">Plane</label>
</div>
<div>
  <input type="checkbox" id="ship" value="Ship">
  <label for="ship">Ship</label>
</div>
```

F I G. 13A

Choose a prefecture.
◉ Tokyo
○ Kanagawa
○ Saitama

Choose a transportation.
☑ Car
☐ Plane
☐ Ship

F I G. 13B

```
{
  "element" : "input",
  "rect" : { "top" : 60, "left" : 40, "width" : 180, "height" : 140 },
  "radio" : [
    { "id" : 0, "value" : "Tokyo", "label" : "Tokyo", "checked" : 1,
      "style" : "font-size:32px; },
    { "id" : 1, "value" : "Kanagawa", "label" : "Kanagawa", "checked" : 0,
      "style" : "font-size:32px; },
    { "id" : 2, "value" : "Saitama", "label" : "Saitama", "checked" : 0,
      "style" : "font-size:32px; },
  ],
  "style" : "background-color: white;"
}
{
  "element" : "input",
  "rect" : { "top" : 300, "left" : 40, "width" : 120, "height" : 160 },
  "checkbox" : [
    { "id" : 0, "value" : "Car", "label" : "Char", "checked" : 1,
      "style" : "font-size:32px; },
    { "id" : 1, "value" : "Plane", "label" : "Plane", "checked" : 0,
      "style" : "font-size:32px; },
    { "id" : 2, "value" : "Ship", "label" : "Ship", "checked" : 0,
      "style" : "font-size:32px; },
  ],
  "style" : "background-color: white;"
}
```

F I G. 14A

|  | Web Page Style | Device GUI Style |
|---|---|---|
| radio | background-color:white; | background-color:black; |
| rect | top:60,left:20,width:160,height:160 | top:60,left:0,width:400,height:180 |
| radio[1] | font-size: 36px; | font-size: 44px; |
| radio[2] | font-size: 36px; | font-size: 40px; |
| radio[3] | font-size: 36px; | font-size: 44px; |
| layout | 1x3 | 2x2 |

F I G. 14B

|  | Web Page Style | Device GUI Style |
|---|---|---|
| checkbox | background-color:white; | background-color:green; |
| rect | top:300,left:40,width:120,height:160 | top:300,left:0,width:400,height:180 |
| checkbox[1] | font-size: 36px; | font-size: 44px; |
| checkbox[2] | font-size: 36px; | font-size: 44px; |
| checkbox[3] | font-size: 36px; | font-size: 44px; |
| layout | 1x3 | 2x2 |

F I G. 14C

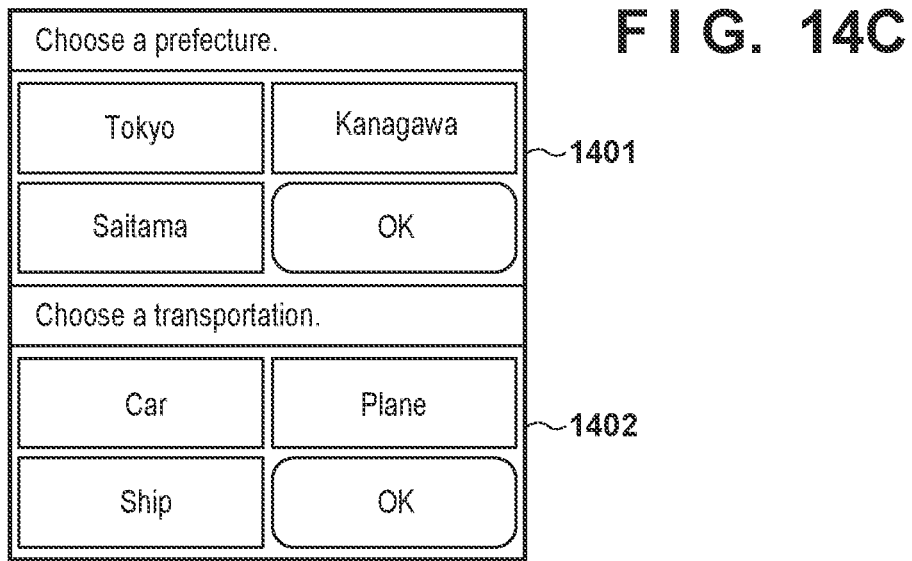

F I G. 14D

{ "radio" : {{ "selected-value" : "Tokyo" }, { "selected-id" : 1 }}
    "checkbox" : {{ "selected-value" : "Car" }, { "selected-id" : 1}}}

COMMUNICATION APPARATUS, IMAGE GENERATION SYSTEM, CONTROL METHOD OF COMMUNICATION APPARATUS, CONTROL METHOD OF IMAGE GENERATION SYSTEM, AND NON-TRANSITORY COMPUTER-READABLE STORAGE MEDIUM

BACKGROUND

Field of the Disclosure

The present disclosure relates to a communication apparatus, an image generation system, a control method of the communication apparatus, a control method of the image generation system, and a non-transitory computer-readable storage medium.

Description of the Related Art

Presently, a communication apparatus equipped with a Web browser (to be referred to as a browser hereinafter), and having a function of viewing a Web page on the browser is widely used. By displaying a Web page of an external service via the browser, the communication apparatus can cooperate with the external service.

Some Web pages, such as a user information registration screen and a questionnaire screen, interact with a user to let the user select and designate information. When implementing such a Web page, a selection element that can display a specific Graphical User Interface (GUI) part on the screen is used. The position, size, and decoration such as color of the GUI part representing the selection element are decided in accordance with a Web standard specification.

Presently, the browser is also used in embedded products such as a copying machine. In many cases, the embedded products have less memory capacity and disk capacity than PCs and smartphones. Therefore, a browser for embedded products is sometimes installed in a product having removed specific functions from a general-purpose PC browser. Accordingly, the browser for embedded products may not be able to display specific selection elements.

To solve this issue, Japanese Patent No. 6524306 discloses that, in place of a selection element which a browser cannot display, a displayable element is used in accordance with a conversion table defined in advance. By displaying a similar element in place of the element that cannot be displayed originally, it is possible to avoid impairing user's convenience.

Meanwhile, one form of browser is called a cloud browser and generates the drawing result (rendering result) of a Web page on a cloud server. Since processes with high computational loads such as a Web page analysis process and a Web page execution process are executed on the server, the computational loads are removed from the communication apparatus. In the cloud browser, if the size of the drawing result of the Web page generated on an image generation system serving as the cloud server is different from the screen size of the communication apparatus, the communication apparatus enlarges or reduces the drawing result in accordance with the screen size. Since the cloud browser is a service for a low-functionality product that cannot be equipped with an embedded browser, the screen size of the communication apparatus is often smaller than the drawing result of the Web page. Therefore, in many cases, the communication apparatus reduces the drawing result acquired from the cloud service for display.

However, in the technique disclosed in Japanese Patent No. 6524306, the GUI part of the selection element viewed by the user is displayed on the screen of the communication apparatus, and the communication apparatus reduces the drawing result generated by the image generation system, so that the selection element is displayed at a small size. Accordingly, it is difficult to perform selection in accordance with user's intention.

SUMMARY

Embodiments of the present disclosure have been made in consideration of the above-described issue, and provide a technique for appropriately displaying a selection element which a user can select on a communication apparatus using a cloud browser.

According to embodiments of the present disclosure, there is provided a communication apparatus capable of communication with an image generation system functioning as a cloud browser, the communication apparatus comprising: a reception unit configured to receive, from the image generation system, selection element related information related to a selection element in a Web page being displayed using the cloud browser; a generation unit configured to generate, based on the selection element related information, a selection UI to display the selection element converted from a first display format in the Web page to a second display format different from the first display format; and a control unit configured to cause a display unit of the communication apparatus to display the selection UI.

Further features of the present disclosure will become apparent from the following description of exemplary embodiments (with reference to the attached drawings).

BRIEF DESCRIPTION OF THE DRAWINGS

FIG. 1 is a view showing an example of the hardware arrangement of a virtual machine according to the first embodiment;

FIG. 4 is a flowchart illustrating the procedure of a process executed by the communication apparatus according to the first embodiment;

FIG. 5A is a view showing an implementation example of extraction of selection element related information by the image generation system according to the first embodiment;

FIG. 5B is a view showing an implementation example of application of a selection result according to the first embodiment;

FIG. 6A is a view showing a description example of a Web page including a selection element according to the first embodiment;

FIG. 6B is a view showing a representation example of selection element related information according to the first embodiment;

FIG. 6C is a view showing an example of converting the selection element related information to a display format suitable for the screen size of a communication apparatus according to the first embodiment;

FIG. 6D is a view showing a representation example of a selection result according to the first embodiment;

FIGS. 7A and 7B are views showing the display result of the selection element based on a Web standard specification;

FIG. 7C is a view showing a display result obtained by fitting the display result of the selection element based on the Web standard specification to the screen size of the communication apparatus;

FIGS. 8A to 8C are views showing the display result of the selection element suitable for the screen size of the communication apparatus according to the first embodiment;

FIGS. 9A to 9C are views showing an example in which the operation method of the selection element (the type of a selection UI) has been changed in accordance with the screen size of the communication apparatus;

FIG. 10 is a flowchart illustrating the procedure of a process executed by an image generation system according to the second embodiment;

FIG. 11 is a flowchart illustrating the procedure of a process executed by a communication apparatus according to the second embodiment;

FIG. 12 is a view showing a description example of a Web page including a plurality of selection elements according to the second embodiment;

FIG. 13A is a view showing the display result of the Web page including the plurality of selection elements based on a Web standard specification;

FIG. 13B is a view showing a representation example of selection element related information including the plurality of selection elements;

FIG. 14A is a result summarizing designations concerning a display format of a selection UI decided in process for a radio button;

FIG. 14B is a result summarizing designations concerning a display format of a selection UI decided in process for a checkbox;

FIG. 14C is a result obtained by displaying a selection UI superimposed on a drawing result; and FIG. 14D is a view showing the result of deciding the selection candidates for a radio button and a checkbox by a user operating a selection UI.

DESCRIPTION OF THE EMBODIMENTS

Figure 2:
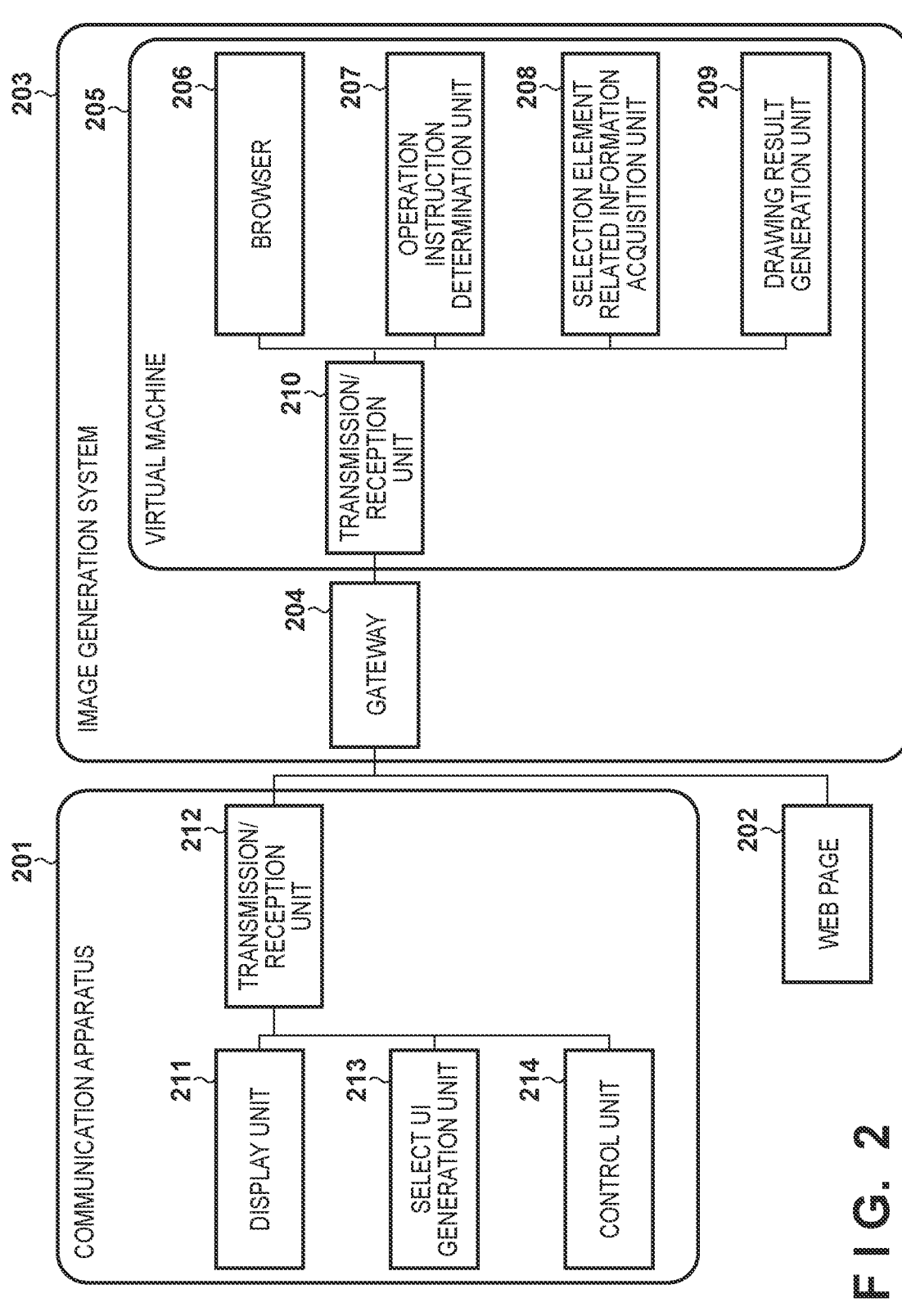
FIG. 2 is a view showing an example of the arrangements of an image generation system and a communication apparatus according to the first embodiment.

Hereinafter, embodiments will be described in detail with reference to the attached drawings. Note, the following embodiments are not intended to limit the scope of the disclosure. Multiple features are described in the embodiments, but limitation is not made to the disclosure, and multiple such features may be combined as appropriate. Furthermore, in the attached drawings, the same reference numerals are given to the same or similar configurations, and redundant description thereof is omitted.

First Embodiment

In this embodiment, an example will be described in which a cloud browser receives, from a remote cloud service, the drawing result (rendering result) of a Web page including a selection element and selection element related information, and displays the selection element superimposed on the drawing result in accordance with the screen size of a communication apparatus. Here, representative examples of the selection element included in the Web page are a select element, a radio button, a checkbox, and the like. In this embodiment, an example of displaying a Web page including a select element is displayed in the communication apparatus will be described.

<Hardware Arrangement>

Figure 1:
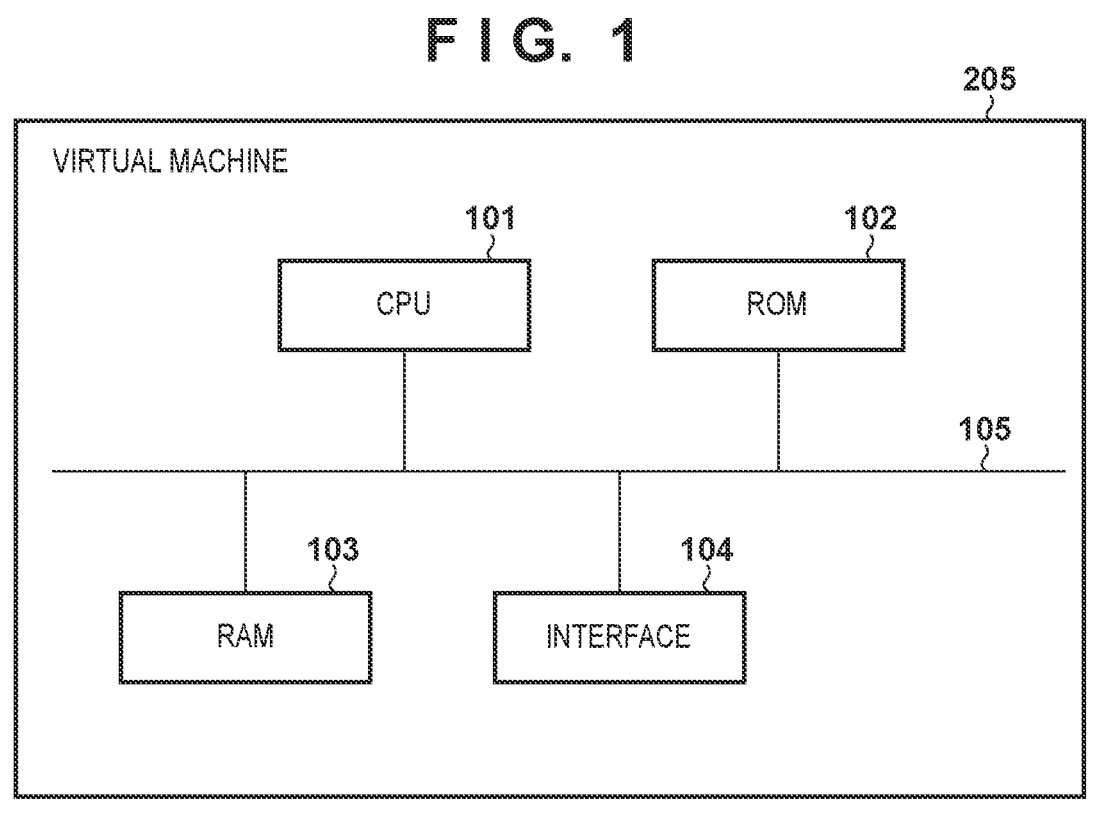

FIG. 1 is a view showing an example of the hardware arrangement of a virtual machine included in an image generation system according to this embodiment.

In FIG. 1, reference numeral 101 denotes one or more Central Processing Units (CPU) that control an entire virtual machine 205 shown in FIG. 2. Reference numeral 102 denotes a Read Only Memory (ROM) for storing programs and parameters that need not be changed. Reference numeral 103 denotes a Random Access Memory (RAM) for temporarily storing programs and data supplied from an external apparatus and the like. Reference numeral 104 denotes an interface for displaying the held data and supplied data.

Reference numeral 105 denotes a system bus that communicably connects the respective components of the CPU 101 to the interface 104 to each other. There may be an interface with a pointing device such as a mouse and an input device such as a keyboard used to input data by accepting a user operation. There may also be a hard disk or a memory card virtually provided in the virtual machine 205 while being fixed thereto. Alternatively, there may be an external storage apparatus including an optical disk such as a Flexible Disk (FD) or a Compact Disk (CD), a magnetic or optical card, an IC card, or a memory card, which is virtually attachable/detachable to/from the virtual machine 205. Further, there may be a network interface for connecting to a network line such as the Internet.

<Arrangements of Image Generation System and Communication Apparatus>

Next, an example of the arrangement of a cloud browser according to this embodiment will be described. FIG. 2 is a view showing the arrangements of an image generation system and a communication apparatus according to the first embodiment. In FIG. 2, reference numeral 201 denotes a communication apparatus, and reference numeral 203 denotes an image generation system. In this embodiment, the communication apparatus 201 is, for example, a Multifunction Peripheral (MFP), and the image generation system 203 provides the function of a cloud browser.

The user is viewing the screen of the communication apparatus 201. The communication apparatus 201 transmits the URL of a Web page 202 which the user wants to view to the image generation system 203 via a transmission/reception unit 212.

Then, the image generation system 203 accesses the Web page 202 using the received URL, and a drawing result generation unit (a rendering result generation unit) 209 generates the drawing result (rendering result) of the Web page 202. Thereafter, if a request to acquire the drawing result is received from the communication apparatus 201, the image generation system 203 transmits the drawing result generated by the drawing result generation unit 209 to the communication apparatus 201 via a transmission/reception unit 210. The communication apparatus 201 receives the drawing result via the transmission/reception unit 212. Further, a selection UI generation unit 213 generates a selection UI in accordance with the screen size of a display unit 211 of the communication apparatus 201. A control unit 214 displays, on the display unit 211, the selection UI superimposed on the received drawing result. Thereafter, the display unit 211 displays a dedicated view on the screen.

Here, the selection UI indicates a UI generated on the communication apparatus side to display a selection candidate. A display result of a selection candidate displayed by the embedded browser based on the Web standard technique is not called the selection UI in this embodiment.

The image generation system 203 includes a gateway 204 and the virtual machine 205. A browser 206 operates on the virtual machine 205. The browser 206 is a so-called browser engine, and analyses HTML, JavaScript®, CSS, and the like, and executes processing associated with a user operation or a communication event. Communication between the communication apparatus 201 and the virtual machine 205 and communication between the Web page 202 and the virtual machine 205 are performed via the gateway 204.

An operation instruction determination unit 207 of the virtual machine 205 determines, based on the user operation instruction received from the communication apparatus 201, whether the user has pressed a selection element included in the Web page 202 being displayed by the browser 206. The selection element can include at least one of a checkbox, a command button, a command link, a combo box, a group box, a list box, a list view, a radio button, a slider, and a spin control. If the user operation instruction is an instruction to press the selection element, a selection element related information acquisition unit 208 acquires selection element related information. The selection element related information can include at least one of the display position of the selection element, the display size of the selection element, the decoration information (color or the like) of the selection element, and the arrangement order of the selection element.

<Process of Image Generation System>

Figure 3:
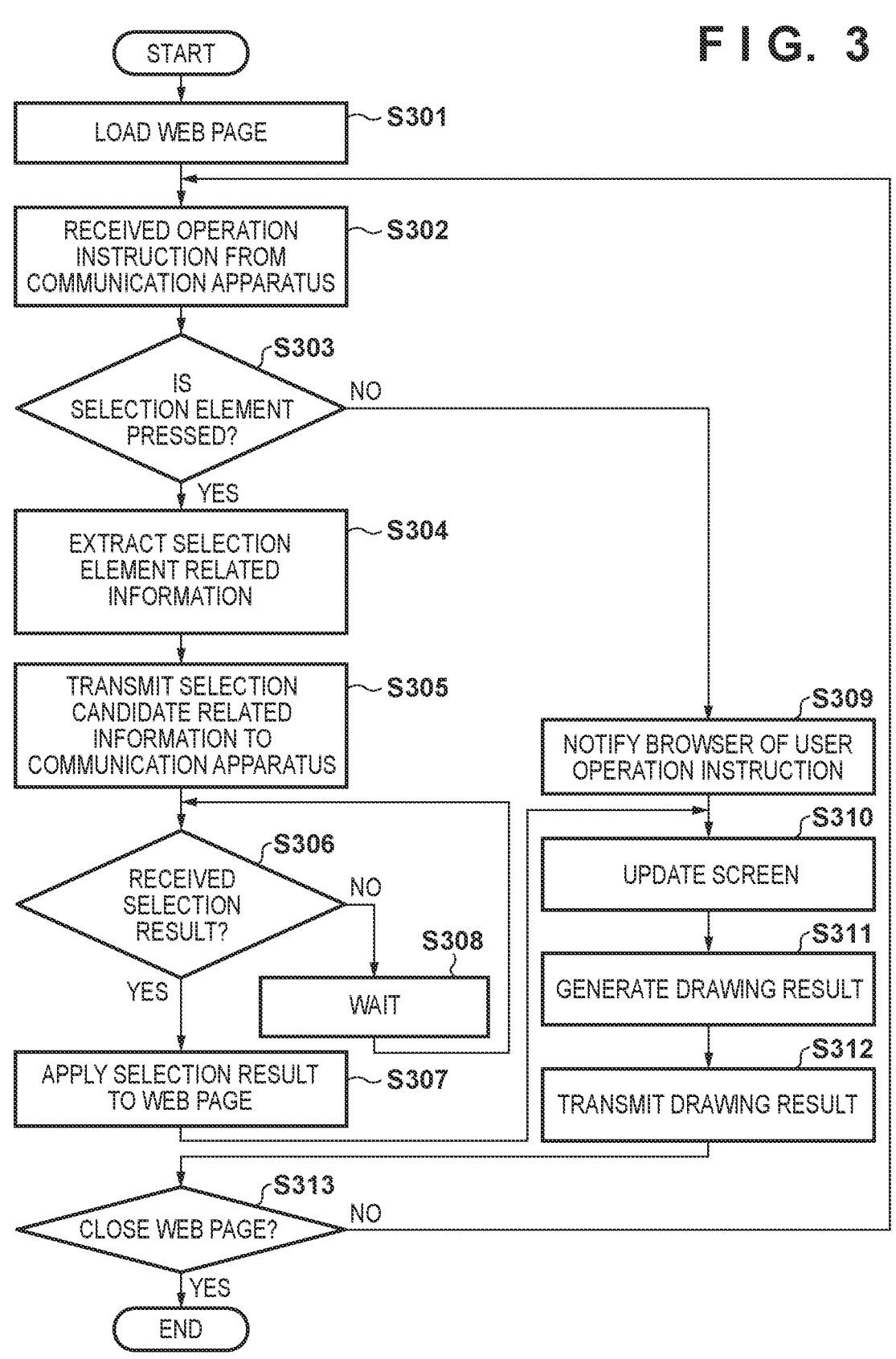
FIG. 3 is a flowchart illustrating the procedure of a process executed by the image generation system according to the first embodiment.

Subsequently, the procedure of a process executed by the image generation system (virtual machine) according to this embodiment will be described with reference to the flowchart of FIG. 3.

(Step S301)

In step S301, the browser 206 loads the Web page of the URL received from the communication apparatus 201.

(Step S302)

In step S302, the operation instruction determination unit 207 receives a user operation instruction transmitted from the communication apparatus 201. The user operation instruction includes, for example, information indicating the attribute of a "tap" operation of touching the screen of the communication apparatus 201 with a finger, a "key input" operation of pressing the keyboard equipped on the communication apparatus 201, or the like. The user operation instruction can also include information attached for each attribute of the operation, such as the x and y coordinates indicating the place touched by the user on the screen of the communication apparatus 201, the value of the key pressed by the user, or the like. The information of the URL of the Web page and the user operation instruction reach the browser 206 through the gateway 204 and the transmission/reception unit 210.

(Step S303)

In step S303, the operation instruction determination unit 207 determines whether the element pressed by the user is a selection element. If the element pressed by the user is a selection element, the process advances to step S304. On the other hand, if the element pressed by the user is not a selection element, the process advances to step S309.

Here, with reference to FIG. 6A and FIGS. 7A to 7C, an example of the display result of a selection element based on the Web standard specification will be described. FIG. 6A shows a description example of a Web page including a select element. The select element includes four option elements as child elements. ----- serving as the first option element is displayed before the user operates the selection element.

FIG. 7A shows the display result of FIG. 6A. Since ----- is the first option element, ----- is displayed in FIG. 7A. If the user presses the portion of -----, it is determined in step S303 that the element pressed by the user is a selection element.

If it is determined in an embedded browser that the user has pressed the portion of -----, the embedded browser displays FIG. 7B. In FIG. 7B, four option elements are vertically arranged and displayed.

In a case of the cloud browser, the image generation system 203 generates the drawing result as shown in FIG. 7A or FIG. 7B, and transmits it to the communication apparatus 201. FIG. 7C shows the result obtained by reducing the display result shown in FIG. 7B in accordance with the screen size of the communication apparatus 201. As can be seen from FIG. 7C, the selection element is also reduced and displayed, so that it is difficult for the user to select the selection element.

(Step S304)

In step S304, the selection element related information acquisition unit 208 extracts selection element related information from the Web page. Here, FIG. 5A shows an implementation example of extraction of selection element related information. The element located at the coordinates pressed by the user is stored in target in FIG. 5A. If the element pressed by the user is a select element, the select element is stored in target.

Here, the position and size of the selection element included in the selection element related information can be acquired from target.getBoundingClientRect( ). target.getBoundingClientRect( ) outputs x and y coordinates, width, and height.

(Step S305)

In step S305, the selection element related information acquisition unit 208 transmits the selection element related information acquired in step S304 to the communication apparatus 201 via the transmission/reception unit 210.

(Step S306)

In step S306, the drawing result generation unit 209 determines whether a user selection result is received from the communication apparatus 201 via the transmission/reception unit 210. If a selection result is received, the process advances to step S307. On the other hand, if a selection result is not received, the process advances to step S308.

(Step S307)

In step S307, the drawing result generation unit 209 applies the selection result received from the communication apparatus 201 to the Web page.

Here, with reference to FIGS. 5B and 6D, details of processing in step S307 will be described. FIG. 5B shows an implementation example of application of the selection result to the Web page. FIG. 6D shows a representation example of the selection result.

In FIG. 5B, selected of the first selection candidate is designated to true. It can be seen from FIG. 6D that the first selection candidate of the selection element is selected. If the communication apparatus 201 transmits the character string in FIG. 6D to the image generation system 203, in step S307, the image generation system 203 uses the implementation shown in FIG. 5B to set the first selection candidate in a selected state on the Web page.

(Step S308)

In step S308, the drawing result generation unit 209 puts processing on standby for a predetermined time, and then returns to step S306.

(Step S309)

In step S309, the operation instruction determination unit 207 notifies the browser 206 of the user operation instruction.

(Step S310)

In step S310, the drawing result generation unit 209 updates the screen. Since the selection result is applied to the Web page in step S307, the portion of -----in FIG. 7A is replaced with the selection candidate selected by the user.

(Step S311)

In step S311, the drawing result generation unit 209 generates a drawing result.

(Step S312)

In step S312, the browser 206 transmits the drawing result to the communication apparatus 201 via the transmission/reception unit 210.

(Step S313)

In step S313, the operation instruction determination unit 207 determines whether the user has finished viewing the Web page. If the user has finished viewing the Web page, the process ends. On the other hand, if the user continues to view the Web page, the process returns to step S302.

<Process of Communication Apparatus>

Next, the procedure of a process executed by the communication apparatus according to this embodiment will be described with reference to the flowchart of FIG. 4.

In step S401, the control unit 214 activates a dedicated view, and accepts a user operation instruction. In step S402, the control unit 214 transmits the user operation instruction to the image generation system 203 via the transmission/reception unit 212. In step S403, the control unit 214 determines whether selection element related information is received from the image generation system 203. If selection element related information is received, the process advances to step S404. On the other hand, if selection element related information is not received, the process advances to step S412.

In step S404, the selection UI generation unit 213 extracts, from the selection element related information, a selection candidate whose value is empty. Here, FIG. 6B shows a representation example of the selection element related information. It can be seen from FIG. 6B that the value of the selection candidate whose id is 0 is empty. In this embodiment, if the value of the selection candidate is empty, this selection candidate is not displayed in the selection UI. The reason for this is that, since the selection candidate whose value is empty is used as a specified value before the user selects the selection candidate, there are few cases in which the user intentionally selects the specified value. The specified value in FIG. 7B is the portion of -----. Note that the example in which the selection candidate whose value is empty is not displayed in the selection UI has been described in this embodiment, but it may be displayed in the selection UI.

In step S405, the selection UI generation unit 213 decides the type of the selection UI. Examples of the type of the selection UI are a tile-like UI with selection candidate buttons arranged therein, and a drum roll with selection candidates arranged in a pseudo cylinder. Here, FIGS. 9A to 9C show an example of the drum roll. If the downward pointing triangle in FIG. 9A is pressed, the display result shown in FIG. 9B is displayed. If the downward pointing triangle in FIG. 9B is further pressed, the display result shown in FIG. 9C is displayed.

In this embodiment, a selection UI 810 as shown in FIG. 8B, which is a tile-like UI with a plurality of selection candidate buttons 811 arranged therein, is employed as the type of the selection UI. However, in a case of a large number of selection candidates, each selection candidate is displayed small if the selection candidates are arranged in tiles. In this case, the selection candidates may be displayed in a drum roll.

In step S406, the selection UI generation unit 213 decides the layout of the selection UI. In this embodiment, the selection element related information received from the image generation system 203 is as shown in FIG. 6B, and there are four selection candidates. Of the four selection candidates, three selection candidates other than the element, whose value is empty, extracted in step S404 are to be displayed. Adding an OK button to these three selection candidates, four buttons in total are arranged in two rows and two columns. In this manner, the layout is decided based on the number of selection candidates.

In step S407, the selection UI generation unit 213 decides the font size of the selection candidate. In this embodiment, the font size is changed for each selection candidate. More specifically, the font size is changed in accordance with the number of character strings in the display words of the selection candidate. For example, for Tokyo, there are five letters, and it can fit in one row even with a large font size. On the other hand, for Kanagawa, there are eight letters, so that the line breaks with the same font size as Tokyo. Therefore, a font size smaller than the font size for Tokyo is used for Kanagawa. In this embodiment, the font size for Tokyo is of 44 px, and the font size for Kanagawa is of 40 px.

In step S408, the selection UI generation unit 213 decides the decoration (for example, color) of the selection UI. Referring to FIG. 6A, the background color of the selection candidate in the Web page is not designated. Accordingly, the background color of the selection candidate is white which is the predetermined color of the Web page. However, if the color remains the predetermined color, it is not conspicuous. Therefore, the background color of the selection candidate is decided to be black in the selection UI.

The designations concerning the display format of the selection UI decided in the process from step S404 to step S408 are summarized in FIG. 6C. In FIG. 6C, Web Page Style indicates the display format following the Web standard technique. Device GUI Style indicates the display format of the selection UI in this embodiment.

Here, FIG. 8A shows the display result in the display format of Web Page Style shown in FIG. 6C. FIG. 8B shows the display result in the display format of Device GUI Style. As can be seen from FIG. 8A, in the display result of the embedded browser, the selection candidate 801 is displayed small with 40 px in height and 160 px in width. To the contrary, in FIG. 8B, the selection UI generation unit 213 generates the selection UI 810 which displays the selection candidate 811 with 100 px in height and 180 px in width so that the selection candidate is displayed large. That is, the display format of Device GUI Style has higher visibility on the display unit 211 of the communication apparatus 201 than the display format of Web Page Style.

In step S409, the control unit 214 displays, on the display unit 211, the selection UI 810 superimposed on the drawing result 701 as shown in FIG. 7A. FIG. 8C shows the result displayed on the screen of the communication apparatus by the display unit 211. Thereafter, the user operates the display result shown in FIG. 8C, the user selection is accepted, and the selection result is acquired. In step S410, the control unit 214 transmits the selection result to the image generation system 203 via the transmission/reception unit 212. In step S411, the control unit 214 determines whether the user has finished viewing using the cloud browser. If the user has finished viewing, the process ends. On the other hand, if the user continues viewing, the process returns to step S402.

In step S412, the control unit 214 determines whether a drawing result is received from the image generation system 203. If a drawing result is received, the process advances to step S413. On the other hand, if a drawing result is not received, the process advances to step S411.

In step S413, the control unit 214 displays the received drawing result on the screen of the display unit 211. In this embodiment, the drawing result is displayed on the screen by displaying the drawing result in the dedicated view, and displaying the dedicated view on the screen by the display unit 211.

As has been described above, according to this embodiment, even if the screen size of the communication apparatus is small, it is possible to display the selection candidate large, for example, as shown in FIG. 8C, so that the user can easily select the selection result. That is, when displaying the selection element on the screen of the communication apparatus, it is possible to display the selection element in an easily visible display format in accordance with the screen size of the communication apparatus.

As has been described above, according to this embodiment, it becomes possible to appropriately display a selection element selectable by a user in a communication apparatus using a cloud browser.

Second Embodiment

In this embodiment, an example will be described in which, in a cloud browser, the drawing result of a Web page including a plurality of kinds of selection elements and selection element related information are received from a remote cloud service, and the selection elements superimposed on the drawing result are displayed in accordance with the screen size of a communication apparatus. In this embodiment, an example will be described in which the communication apparatus displays a Web page including a radio button and a checkbox. In addition, the procedure of, by simultaneously displaying the plurality of kinds of selection elements in a selection UI, performing selection operations for the plurality of kinds of selection elements with one user operation will be described. The system configuration and the apparatus arrangement are similar to those in the first embodiment, so that a description thereof will be omitted.
<Process of Image Generation System>

First, with reference to the flowchart of FIG. 10, the procedure of a process executed by an image generation system according to this embodiment will be described. The same processing as in the first embodiment is denoted by the same step number, and a detailed description thereof is omitted.

In this embodiment, the processing in step S1004 is executed in place of the processing in step S304. In the first embodiment, the example has been described in which the selection element related information of the selection element pressed by the user is extracted in step S304. To the contrary, in this embodiment, in step S1004, a selection element related information acquisition unit 208 extracts selection element related information for all kinds of the selection elements being displayed.
<Process of Communication Apparatus>

Next, with reference to the flowchart of FIG. 11, the procedure of a process executed by a communication apparatus according to this embodiment will be described. The same processing as in the first embodiment is denoted by the same step number, and a detailed description thereof is omitted. In the first embodiment, only one kind of selection element is handled.

However, in this embodiment, a plurality of kinds of selection elements included in the Web page are handled. Therefore, in this embodiment, the processing in step S1101 and the processing in step S1102 are added to the process in the first embodiment to sequentially process all kinds of selection elements included in the selection element related information. For example, in this embodiment, selection element related information including a radio button and a checkbox is received in step S403, so that the process from step S1102 to step S408 is executed twice.

Here, with reference to FIGS. 12 and 13A, the display result of the plurality of kinds of selection elements based on a Web standard specification will be described. FIG. 12 shows a description example of a Web page including a radio button and a checkbox. The radio button shown in FIG. 12 has three options of Tokyo, Kanazawa, and Saitama. The checkbox shown in FIG. 12 has three options of Car, Plane, and Ship. The option given with the checked attribute is set in a selected state before the user decides the selection result.

FIG. 13A shows the display result of the description example shown in FIG. 12. If the display result shown in FIG. 13A is reduced in accordance with the screen size of a communication apparatus, the selection elements are also reduced and displayed. Accordingly, it becomes difficult for the user to select the selection elements.

On the other hand, FIG. 13B shows the selection element related information extracted in step S1004 of FIG. 10. FIG. 13B includes two kinds of selection elements whose "element" keys are "input". One has a "radio" key, and the other has a "checkbox" key. The selection element of "input" having the "radio" key indicates the radio button, and the selection element of "input" having the "checkbox" key indicates the checkbox.

FIG. 14A shows a result summarizing designations concerning the display format of the selection UI decided in the process from step S404 to step S408 of FIG. 11 for the radio button. FIG. 14B shows a result summarizing designations concerning the display format of the selection UI decided in the process from step S404 to step S408 of FIG. 11 for the checkbox. In this embodiment, the same format as in the first embodiment is used for the type of the selection UI, the layout of the selection UI (the position and size of the selection element), the font size of each selection candidate included in the selection element, and the decoration (for example, color) of the selection UI.

FIG. 14C shows a result, displayed in step S409 of FIG. 11, obtained by displaying the selection UI superimposed on the drawing result displayed thus far. In FIG. 14C, the selection UI includes a selection UI 1401 and a selection UI 1402. The selection UI 1401 shows selection candidates for the radio button, and the selection UI 1402 shows selection candidates for the checkbox. In the selection UI shown in FIG. 14C, the selection candidates for the radio button and the selection candidates for the checkbox are simultaneously displayed large. With this, after the selection candidate for the radio button is decided, the selection candidate for the checkbox can be further decided on the screen shown in FIG. 14C without pressing the checkbox.

Information described in FIG. 14D shows the result of deciding the selection candidates for the radio button and the checkbox by the user operating the selection UI. The information described in FIG. 14D is transmitted to an image generation system 203 in step S410. In step S307, the image generation system 203 reflects the selection results on the Web page based on the information described in FIG. 14D.

As has been described above, according to this embodiment, by simultaneously displaying a plurality of kinds of selection elements in a selection UI, selection operations for the plurality of kinds of selection elements can be performed with one user operation.

According to embodiments of the present disclosure, it becomes possible to appropriately display a selection element selectable by a user in a communication apparatus using a cloud browser.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-182058, filed Nov. 14, 2022, which is hereby incorporated by reference herein in its entirety.

What is claimed is:

1. A communication apparatus capable of communication with an image generation system functioning as a cloud browser, the communication apparatus comprising:

one or more processors; and at least one memory storing executable instructions, which when executed by the one or more processors, cause the communication apparatus to perform operations comprising:

accepting an operation instruction to a Web page that is being displayed on a screen of the communication apparatus using the cloud browser;

transmitting the operation instruction to the image generation system;

receiving selection element related information related to a selection element, the selection element related information being information transmitted from the image generation system in a case where the operation instruction is an instruction for pressing the selection element that is being displayed on the Web page;

generating, based on the selection element related information and a size of the screen of the communication apparatus, a selection user interface (UI) to display the selection element converted from a current first display format in the Web page to a second display format that has higher visibility on the screen of the communication apparatus than the first display format; and causing the screen of the communication apparatus to display the selection UI, by superimposing the selection UI on a drawing result of the Web page received from the image generation system.

2. The communication apparatus according to claim 1, wherein the selection element related information includes at least one of a display position of the selection element, a display size of the selection element, decoration information of the selection element, and an arrangement order of the selection element.

3. The communication apparatus according to claim 2, wherein the generating converts the selection element from the first display format to the second display format by changing at least one of the display position, the display size, the decoration information, and the arrangement order.

4. The communication apparatus according to claim 2, wherein the decoration information includes information of a background color.

5. The communication apparatus according to claim 1, wherein if a value of a selection candidate included in the selection element is empty based on the selection element related information, the generating does not include the selection candidate in the selection UI.

6. The communication apparatus according to claim 1, wherein the selection element includes a plurality of kinds of selection elements in the Web page.

7. The communication apparatus according to claim 6, wherein if there are a plurality of kinds of selection elements in the Web page, the generating generates the selection UI for each kind of selection element.

8. The communication apparatus according to claim 1, wherein the selection element includes at least one of a check box, a command button, a command link, a combo box, a group box, a list box, a list view, a radio button, a slider, and a spin control.

9. A control method of a communication apparatus capable of communication with an image generation system functioning as a cloud browser, the control method comprising:

accepting an operation instruction to a Web page that is being displayed on a screen of the communication apparatus using the cloud browser;

transmitting the operation instruction to the image generation system;

receiving selection element related information related to a selection element, the selection element related information being information transmitted from the image generation system in a case where the operation instruction is an instruction for pressing the selection element that is being displayed on the Web page;

generating, based on the selection element related information and a size of the screen of the communication apparatus, a selection user interface (UI) to display the selection element converted from a current first display format in the Web page to a second display format that has higher visibility on the screen of the communication apparatus than the first display format; and causing the screen of the communication apparatus to display the selection UI, by superimposing the selection UI on a drawing result of the Web page received from the image generation system.

10. An image generation system functioning as a cloud browser, the image generation system being capable of communication with a communication apparatus, the image generation system comprising:

one or more processors; and at least one memory storing executable instructions, which when executed by the one or more processors, cause the image generation system to perform operations comprising:

receiving an operation instruction transmitted from the communication apparatus in a case where the operation instruction, which is an operation instruction to a Web page that is being displayed on a screen of the communication apparatus using the cloud browser, is accepted by the communication apparatus;

acquiring, in a case where the operation instruction is an instruction for pressing a selection element that is being displayed in the Web page, selection element related information related to the selection element; and transmitting, to a communication apparatus, the selection element related information acquired in the acquiring, wherein a selection user interface (UI) to display the selection element converted from a current first display format in the Web page to a second display format that has higher visibility on the screen of the communication apparatus than the first display format is generated in the communication apparatus based on the selection element related information and a size of the screen of the communication apparatus, and wherein the selection UI is displayed on the screen of the communication apparatus, by the selection UI being superimposed on a drawing result of the Web page.

11. A control method of an image generation system functioning as a cloud browser, the image generation system being capable of communication with a communication apparatus, the control method comprising:

receiving an operation instruction transmitted from the communication apparatus in a case where the operation instruction, which is an operation instruction to a Web page that is being displayed on a screen of the communication apparatus using the cloud browser, is accepted by the communication apparatus;

acquiring, in a case where the operation instruction is an instruction for pressing a selection element that is being displayed in the Web page, selection element related information related to the selection element; and transmitting, to a communication apparatus, the selection element related information acquired in the acquiring, wherein a selection user interface (UI) to display the selection element converted from a current first display format in the Web page to a second display format that has higher visibility on the screen of the communication apparatus than the first display format is generated in the communication apparatus based on the selection element related information and a size of the screen of the communication apparatus, and wherein the selection UI is displayed on the screen of the communication apparatus, by the selection UI being superimposed on a drawing result of the Web page.

12. A non-transitory computer-readable storage medium storing a program for causing a computer to execute a control method of a communication apparatus capable of communication with an image generation system functioning as a cloud browser, the control method comprising:

accepting an operation instruction to a Web page that is being displayed on a screen of the communication apparatus using the cloud browser;

transmitting the operation instruction to the image generation system;

receiving selection element related information related to a selection element, the selection element related information being information transmitted from the image generation system in a case where the operation instruction is an instruction for pressing the selection element that is being displayed on the Web page;

generating, based on the selection element related information and a size of the screen of the communication apparatus, a selection user interface (UI) to display the selection element converted from a current first display format in the Web page to a second display format that has higher visibility on the screen of the communication apparatus than the first display format; and causing the screen of the communication apparatus to display the selection UI, by superimposing the selection UI on a drawing result of the Web page received from the image generation system.

13. A non-transitory computer-readable storage medium storing a program for causing a computer to execute a control method of an image generation system functioning as a cloud browser, the image generation system being capable of communication with a communication apparatus, the control method comprising:

receiving an operation instruction transmitted from the communication apparatus in a case where the operation instruction, which is an operation instruction to a Web page that is being displayed on a screen of the communication apparatus using the cloud browser, is accepted by the communication apparatus;

acquiring, in a case where the operation instruction is an instruction for pressing a selection element that is being displayed in the Web page, selection element related information related to the selection element; and transmitting, to a communication apparatus, the selection element related information acquired in the acquiring, wherein a selection user interface (UI) to display the selection element converted from a current first display format in the Web page to a second display format that has higher visibility on the screen of the communication apparatus than the first display format is generated in the communication apparatus based on the selection element related information and a size of the screen of the communication apparatus, and wherein the selection UI is displayed on the screen of the communication apparatus, by the selection UI being superimposed on a drawing result of the Web page.

* * * * *